(12) United States Patent
Scribner et al.

(10) Patent No.: US 8,788,278 B2
(45) Date of Patent: Jul. 22, 2014

(54) CONSUMER DATABASE LOYALTY PROGRAM FOR A MONEY TRANSFER SYSTEM

(75) Inventors: Chrismar Scribner, Bloomington, MN (US); Brent Carter, Castle Rock, CO (US); Todd Shellenbarger, Minnetonka, MN (US); Ryan Jandris, Cannon Falls, MN (US); Tani Kalweit, Shakopee, MN (US)

(73) Assignee: MoneyGram International, Inc., Dallas, TX (US)

( * ) Notice: Subject to any disclaimer, the term of this patent is extended or adjusted under 35 U.S.C. 154(b) by 862 days.

(21) Appl. No.: 11/846,323

(22) Filed: Aug. 28, 2007

(65) Prior Publication Data

US 2009/0063261 A1 Mar. 5, 2009

(51) Int. Cl.
*G06Q 30/00* (2012.01)
*G06Q 20/00* (2012.01)
*G06Q 20/16* (2012.01)
*G06Q 30/02* (2012.01)

(52) U.S. Cl.
CPC ............ *G06Q 30/02* (2013.01); *G06Q 30/0273* (2013.01)
USPC ..... 705/1.1; 705/14.1; 705/14.12; 705/14.25; 705/42

(58) Field of Classification Search
USPC ........................ 705/14.1, 14.12, 14.25, 1.1, 42
See application file for complete search history.

(56) References Cited

U.S. PATENT DOCUMENTS

| | | | |
|---|---|---|---|
| 5,326,960 A | 7/1994 | Tannenbaum | |
| 5,864,483 A | 1/1999 | Brichta | |
| 5,920,848 A | 7/1999 | Schutzer et al. | |
| 6,018,718 A | 1/2000 | Walker et al. | |
| 6,205,433 B1 | 3/2001 | Boesch et al. | |
| 6,292,786 B1 | 9/2001 | Deaton et al. | |
| 6,687,679 B1 | 2/2004 | Van Luchene et al. | |
| 6,915,271 B1 | 7/2005 | Meyer et al. | |
| 6,938,013 B1 | 8/2005 | Gutierrez-Sheris | |
| 7,050,983 B2 * | 5/2006 | Kawai | 705/26.1 |

(Continued)

FOREIGN PATENT DOCUMENTS

EP 1866861 A2 12/2007
WO WO 2009/052365 4/2009

OTHER PUBLICATIONS

Information on MoneyGram.com, 2003-2006, archived web pages printed from www.archive.org Date is in the URL in YYYYMMDD format.*

(Continued)

*Primary Examiner* — Naresh Vig
(74) *Attorney, Agent, or Firm* — Faegre Baker Daniels LLP

(57) ABSTRACT

A money transfer system provided in connection with a loyalty program where the loyalty program members are assigned a loyalty identifier. The system includes point of entry ports to communicate transaction information with points of entry; a promotion database, a customer database, a pricing database, an analytics port to communicate marketing information with a marketing analytics system and a transaction processing system. The transaction processing system updates the promotion database as a function of the marketing information, receives money transfer transaction requests including loyalty identifiers, determines whether the requested transactions are entitled to loyalty program promotions, prices the transactions as a function of base transaction pricing and promotions pricing of any promotions to which the transaction is entitled, provides the transaction pricing information, updates the customer database as a function of transaction information and periodically provides transaction information to the analytics port.

21 Claims, 2 Drawing Sheets

(56) References Cited

U.S. PATENT DOCUMENTS

| | | |
|---|---|---|
| 7,213,744 B2 | 5/2007 | Michelson et al. |
| 7,258,268 B2 | 8/2007 | Steiger, Jr. |
| 7,568,615 B2 | 8/2009 | Corona et al. |
| 7,742,942 B2 * | 6/2010 | Nicholson .................... 705/14.1 |
| 7,761,344 B2 | 7/2010 | Smith |
| 7,761,367 B1 * | 7/2010 | Scalora et al. .................. 705/37 |
| 7,810,067 B2 | 10/2010 | Wagener et al. |
| 7,925,513 B2 | 4/2011 | Chao et al. |
| 2002/0002505 A1 | 1/2002 | Kojima |
| 2002/0091603 A1 | 7/2002 | Steiger et al. |
| 2002/0111908 A1 | 8/2002 | Milberger et al. |
| 2002/0143566 A1 | 10/2002 | Diveley |
| 2002/0152177 A1 | 10/2002 | Wolf |
| 2003/0182228 A1 | 9/2003 | Wolf |
| 2003/0208384 A1 | 11/2003 | Nelson et al. |
| 2004/0030647 A1 | 2/2004 | Hansen et al. |
| 2004/0167815 A1 * | 8/2004 | DeLaHunt ....................... 705/14 |
| 2004/0172358 A1 | 9/2004 | Lent et al. |
| 2006/0253321 A1 * | 11/2006 | Heywood ........................ 705/14 |
| 2006/0261150 A1 | 11/2006 | Seifert et al. |
| 2007/0033112 A1 | 2/2007 | Nagle |
| 2007/0088610 A1 * | 4/2007 | Chen ............................... 705/14 |
| 2007/0203821 A1 | 8/2007 | DuFour |
| 2008/0140568 A1 | 6/2008 | Henry |
| 2008/0147506 A1 | 6/2008 | Ling |
| 2008/0154719 A1 * | 6/2008 | Gounares et al. ............... 705/14 |
| 2008/0249908 A1 | 10/2008 | Lorberg et al. |
| 2009/0063261 A1 | 3/2009 | Scribner et al. |
| 2009/0063331 A1 | 3/2009 | Rodin |
| 2009/0106149 A1 | 4/2009 | Bennett et al. |
| 2009/0157520 A1 | 6/2009 | Algiene et al. |
| 2010/0100426 A1 | 4/2010 | Sander et al. |
| 2010/0100477 A1 | 4/2010 | Giammanco |
| 2010/0114774 A1 | 5/2010 | Linaman et al. |
| 2010/0299761 A1 | 11/2010 | Shapiro |
| 2011/0137796 A1 | 6/2011 | Tullis |
| 2011/0282790 A1 | 11/2011 | Bennett et al. |
| 2012/0010993 A1 | 1/2012 | Ferrara et al. |
| 2012/0030098 A1 | 2/2012 | Bulawa et al. |
| 2012/0303524 A1 | 11/2012 | Bertram et al. |

OTHER PUBLICATIONS

MoneyGram Adds 1,500 Bancomer Locations in Mexico, Apr. 17, 2001.*

Banorte selects MoneyGram for US transfers, Apr. 17, 2002, Business News Americas.*

Commission Based on Net Profit, Jun. 13, 2006, Intuit Community.*

Press release from Norkom Technologies, "Wall Street's Back Office Launches Market-Leading AML software from Norkom," Feb. 15, 2007, 2 pp., http://www.norkom.com.

MoneyGram Corporate—How to transfer money, MoneyGram.International, webpages from http://www.moneygram.com/MGICorp/ConsumerProducts . . . 5 pages; May 30, 2007.

International Search Report and Written Opinion issued in PCT/US2008/080292, mailed Jan. 20, 2009, 14 pages.

International Search Report and Written Opinion issued in PCT/US2012/022491, mailed Jul. 5, 2012, 10 pages.

International Search Report and Written Opinion issued in PCT/US2012/038607, mailed Nov. 13, 2012, 20 pages.

International Search Report and Written Opinion issued in PCT/US2013/037595, mailed Jul. 30, 2013, 11 pages.

* cited by examiner

CONSUMER DATABASE LOYALTY PROGRAM FOR A MONEY TRANSFER SYSTEM

TECHNICAL FIELD

The invention relates generally to money transfer systems. In particular, the invention is a consumer database loyalty program and system for use in connection with a money transfer system.

BACKGROUND

Businesses such as Western Union and MoneyGram International offer money transfer and other services through a network of agents. A consumer that desires to use these services to transfer money to a third party takes the money to one of the agents. The agent accepts the money, obtains necessary information such as the consumer's identity and the identity of the third party transferee, and initiates a transaction. The money is then made available to the third party transferee by another agent.

Only limited consumer identity information, such as name and/or phone number, is typically required to initiate a transaction. It can therefore be difficult to effectively market money transfer services to relevant groups and individual consumers. MoneyGram International offers a discount program known as MoneySaver. A card with a MoneySaver membership number is issued to participating consumers, and entitles the consumers to a fixed discount (e.g., 5%) when presented in connection with a transaction request. Again, however, only limited identity information about the consumer is required for membership in the MoneySaver program. Consumers can also have more than one MoneySaver program membership. The MoneySaver program is therefore relatively limited both as a marketing tool and as a source of information about consumers of money transfer services. For these reasons there is a continuing need for improved systems for marketing money transfer services.

SUMMARY

The invention is a consumer database loyalty program and related system for use in connection with a money transfer system. The loyalty program and system enable money transfer services to be effectively marketed to relevant consumer groups and individuals. It also enables efficient information exchange and transaction settlements between the operators of the money transfer system and agents.

One embodiment of the invention includes point of entry ports to communicate transaction information with points of entry, a promotion database including information representative of promotions and promotions pricing, a customer database including information representative of customers' transaction histories, a pricing database including base transaction pricing, an analytics port to communicate marketing information with a marketing analytics system, and a transaction processing system. The transaction processing system can update the promotion database as a function of the marketing information, receive money transfer transaction requests, determine whether requested transactions are entitled to promotions, price the transactions as a function of the base transaction pricing and the promotions pricing of any promotions to which the transaction is entitled, provide transaction pricing information, update the customer database as a function of transaction information, and provide transaction information to the analytics port.

In another embodiment of the invention at least some users of the system are members of a loyalty program and have a loyalty identifier. The promotion database includes information representative of promotions available only to loyalty program members. The transaction processing system can receive money transfer requests including loyalty identifiers, determine whether the received loyalty identifier is valid, determine whether the requested transaction is entitled to any loyalty program promotions, and update the customer database as a function of whether the transaction was entitled to a loyalty program promotion.

Examples of promotions that can be provided by the system include frequency and recurrence promotions, value tiered promotions, volume tiered promotions, and volume plus value tiered promotions.

DETAILED DESCRIPTION

System 10 Overview

Figure 1:
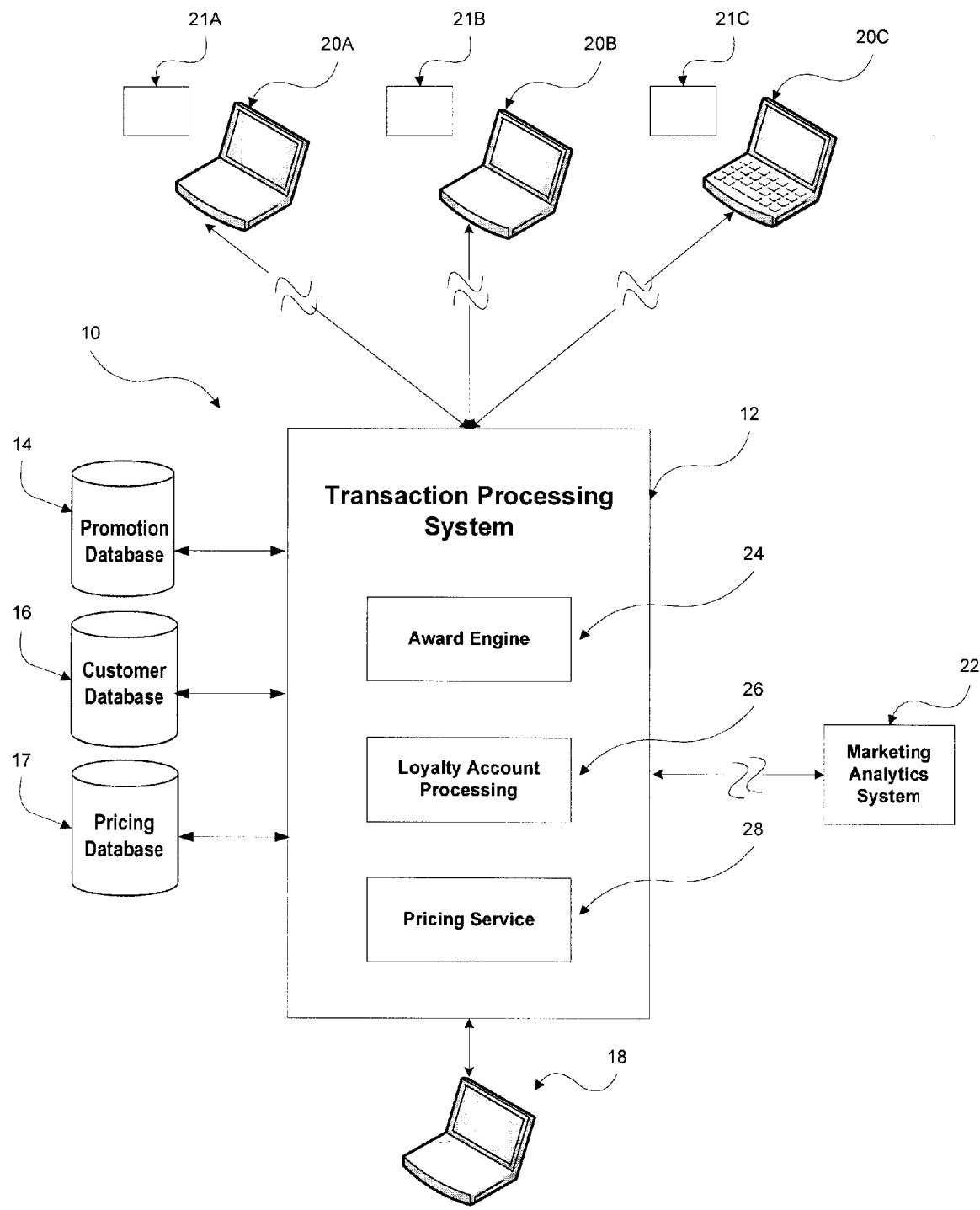
FIG. 1 is a block diagram of the components of a money transfer system for implementing a consumer database loyalty program in accordance with the present invention.

FIG. 1 is a block diagram of a money transfer system 10 including components for providing a consumer database loyalty program in accordance with one embodiment of the present invention. As shown, money transfer system 10 includes transaction processing system 12 interfaced to promotion database 14, customer database 16, pricing database 17 and user interface terminal 18. A marketing analytics system 22 is also interfaced to the transaction processing system 12. Customer access to money transfer system 10 is made through points of entry, shown as remote agent terminals 20A-20C in the illustrated embodiment. Each of the remote terminals 20A-20C is located at the store or other consumer-accessible facility of one of the network of agents providing money transfer services through system 10. Three terminals 20A-20C are shown for purposes of example only. Typically a much larger (e.g., worldwide) network of agents will have terminals such as 20A-20C. The agents operating the terminals 20A-20C can be independent contractors operating under contractual arrangements with the operator of the money transfer system 10. In addition or alternatively, the terminals 20A-20C can be at facilities of the operator of the money transfer system 10.

As described in greater detail below, marketing analytics system 22 receives information relating to the money transfer transactions performed by transaction processing system 12, including the customer identity numbers of the consumers for which the transactions were preformed. Using this information the marketing analytics system 22 can generate relevant marketing information, including proposed promotions. Information relating to promotions available to consumers, including promotion rules and pricing discounts, is stored in promotion database 14. Information relating to base or standard fees can be stored in the pricing database 17. Alternatively, information relating to promotions can also be stored in pricing database 17.

Consumers using money transfer system 10 can, but need not, participate in the loyalty program offered by the operator of the system. Loyalty program members are assigned a customer number or other unique loyalty program identifier.

Loyalty cards with the loyalty program numbers, such as 21A-21C in FIG. 1, can be provided to the consumers for convenience. Typically, however, the loyalty cards 21A-21C need not be presented at transactions to receive loyalty program benefits as long as the customers can be otherwise identified. A fulfillment service (not shown in FIG. 1) that is accessed by consumers through a call center and/or website can accept consumer applications for a customer number, issue the numbers and loyalty cards, and provide related services such as replacing cards and numbers. The fulfillment service can be provided by the operator of the money transfer system 10 or by a third party vendor. The customer numbers are stored in customer database 16, along with other customer-related information including transaction histories (e.g., dates, amounts, send and receive locations) of the money transfer transactions undertaken by the associated consumers. The fulfillment service can also use the customer database 16 in an effort to maintain a desired relationship of one loyalty number to one customer.

Transaction processing system 12 includes award engine 24, loyalty account processor 26 and pricing service 28. As described in greater detail below, award engine 24 uses information in promotion database 14 to determine what promotions, including pricing discounts, may be applicable to money transfer transactions. Pricing service 28 determines the pricing or fees, including promotion discounts, applicable to money transfer transactions initiated by consumers. Loyalty account processor 26 updates the information in customer database 16 following transactions or as new information of the types maintained in the database otherwise becomes available.

Figure 2:
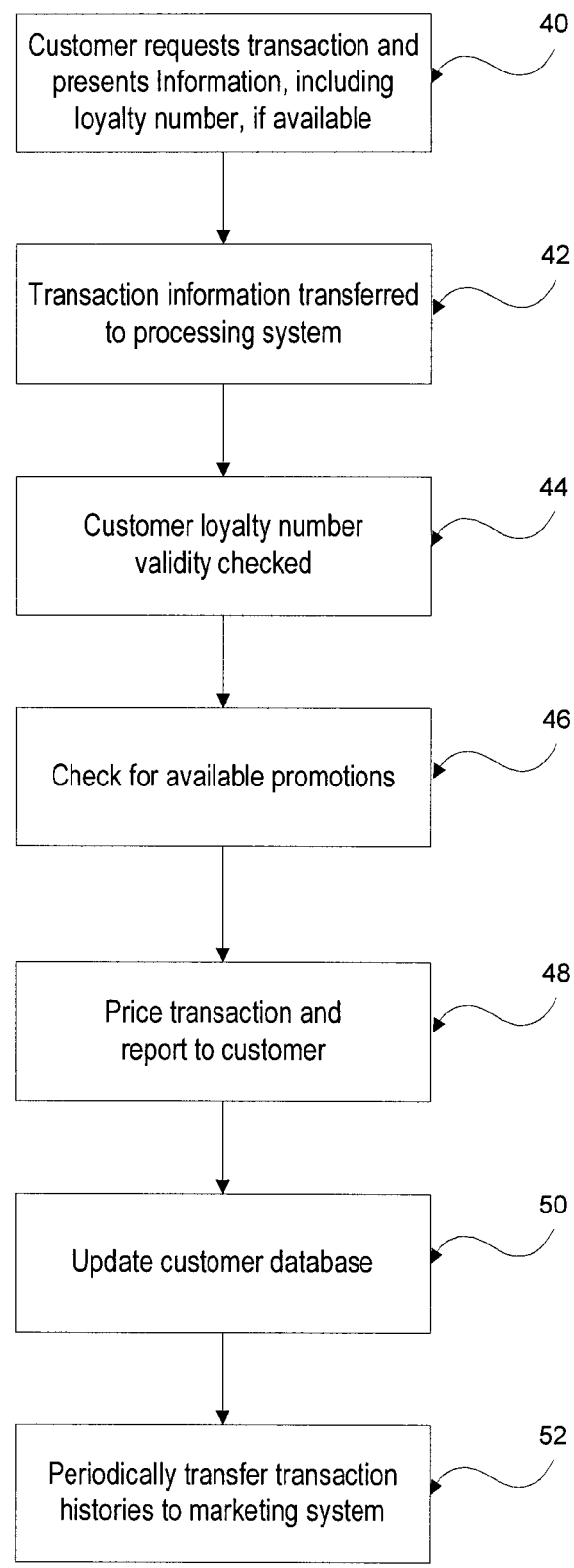
FIG. 2 is a flow diagram of a money transfer transaction performed using the system shown in FIG. 1.

FIG. 2 is a flow chart describing the general operation of system 10 during a money transfer transaction, including the use of loyalty program components. As shown at step 40, a consumer requesting a transaction will provide the agent with the appropriate transaction information (e.g., identification, amount of transfer, transferee and send location) including his or her loyalty program number if they are a loyalty program member. The name and/or telephone number of the consumer can be accepted as identification in some embodiments of the invention. The presentment of the loyalty card itself may or may not be required. For example, if appropriate identification information is presented by the consumer, the agent can access the transaction processing system 12 to determine the consumer's loyalty program number.

The transaction information is entered into the terminal 20A by the agent and transferred to the transaction processing system 12 as shown at step 42. If a loyalty program number was received as part of the transaction information, processing system 12 checks the information in customer database 16 to determine whether that customer number is valid (step 44). As noted above, even if no loyalty program customer number was received, or if the customer number is not valid, the transaction can proceed as one not associated with the loyalty program if other transaction requirements are met. However, the transaction would not be entitled to any promotions reserved for loyalty program customers, and information relating to the transaction may not be stored in the customer database 16.

If it is determined at step 44 that a valid customer number has been presented, award engine 24 checks the promotions database 14 to determine if the requested transaction is eligible for any promotions (step 46). At step 48 the transaction is then priced using the relevant pricing information in promotion database 14 and/or pricing database 17, and the pricing information is communicated back to the consumer through terminal 20A. If the customer is not a loyalty program member or the transaction is not entitled to any promotions, pricing service 28 determines the base fee applicable to the transaction using the information in pricing database 17, and that base fee is returned to the terminal 20A. The information communicated to the consumer can include a description of any applicable promotions and the discount applied. Information regarding the transaction is stored in the customer database 16 as shown at step 50. The transaction can be logged as a loyalty program transaction if it is entitled to benefits of the program, or logged as a non-loyalty program transaction if for any reason it was not entitled to the benefits of the program. Examples of the transaction information that can be stored include the name and location of the transferee, the type of transaction and the dollar value, date and time of the transaction. Periodically (e.g., daily), the updated transaction histories in customer database 16 can be transferred to marketing analytics system 22 as shown by step 52.

A more detailed description of various components of money transfer system 10 and its operation follow.

Agent Terminals 20A-20C

Although the illustrated embodiment of the invention uses terminals 20A-20C for initiating money transfer transactions, other embodiments of the invention (not shown) include other and/or additional points of entry such as a website or a telephone call center that can be accessed by a consumer. The terminals 20A-20C can be interfaced to the transaction processing system 12 through conventional data and information communication ports. Entry of the consumer's phone number or customer number can be accepted as an identifier by the transaction processing system 12 for purposes of identifying the customer. The entry of a loyalty program customer number belonging to the consumer present at the agent terminals 20A-20C is required for the transaction to count toward loyalty promotions available to the consumer in some, but not all, embodiments of the invention.

As described below, some promotions available to the consumer can require a promotion code or other promotion identifier. The terminals 20A-20C can validate the format of the promotion identifiers at the time of entry. The promotion identifiers are transferred to the award engine 24 for use in determining promotions available to the consumer.

The terminals 20A-20C can display and print receipts including the promotion identifiers, the non-discounted base fee amount, discount amount and fee amount for quotes and transaction confirmations. The discount amount value can be calculated and displayed at the terminals 20A-20C using the fee amount and base fee amount. A promotion identifier can but need not be returned to the terminals 20A-20C even if one was entered.

Promotional messages provided by transaction processing system 12 can be displayed and printed by the terminals 20A-20C. The text messages can, for example, alert the agent and/or consumer that the next transaction will be subject to a promotion (e.g., free or discounted). The message can also provide a promotion identifier with an offer to participate in another promotion. Terminals 20A-20C can periodically receive and store promotional message updates from transaction processing system 12.

Customer Services Provided by System 12

Customer services can be offered to agents operating terminal 20A-20C and/or the customers. For example, the number of loyalty program transactions completed by each customer can be maintained in the customer database 16 and provided upon request. This transaction history information can be provided with the discount amounts awarded, accrual tallies by transaction volume and face value. Transactions not associated with any promotion can also be shown. Alternatively, the number of qualified transactions can be determined from an evaluation of stored information regarding the customer's previous transactions. New customers can enroll in the loyalty program. Existing customers can request replacement loyalty program cards. Descriptions, legal terms and conditions and other promotion-related facts can be provided, and can be organized by links to the promotion names. Customer information such as marketing and promotion opt-in/out preferences, address, phone number, e-mail address, and names stored in the customer database 16 can be updated to enhance promotion history integrity.

Customer Database 16

Customer identification and transaction history information can be stored in customer database 16. As is discussed above, the stored identification information can include customer name, address, telephone number, loyalty program number and user preferences. Stored transaction history information associated with customers can include promotion IDs, promotion codes, the non-discounted or original fee amount, the loyalty program discount amount, promotion discount amounts, fee amount, send location and time and date of the transaction. Customer segments for explicit or customer direct offers can be associated with promotional codes or piece codes and promotions so the transaction processing system 12 can determine the customer's eligibility for promotions. Each transaction history associates to one customer and to either one or no loyalty program numbers in one embodiment of the invention. Up to forty-eight months of transaction history are stored for customers in one embodiment of the invention, although transaction histories over longer and shorter periods are stored in other embodiments.

A replica of the customer database 16 can be stored as part of the marketing analytics system 22. In these embodiments the data in the replicated version of the customer database 16 is periodically updated with the customer and transactional activity to ensure synchronous integrity of the local and remote content.

Marketing Analytics System 22

Marketing analytics system 22 provides a number of marketing and campaign management functions. Although not shown in FIG. 1, system 22 includes user interfaces and software tools in connection with these functions. Functions of these types can, for example, be provided by Epsilon Data Management, LLC of Dallas, Tex., and include the following. System 22 is interfaced to the transaction processing system 12 through conventional data or information communication ports, and can be located in the physical proximity to or remotely from the processing system.

Provision of Segmented Customer Lists. A tool can supply files or lists of segmented and selected consumers from the customer database 16 (or a replica at system 22). The criteria for these selections can be inputted by an operator through terminal 18. For example, the tool can produce lists of customers that are pre-qualified for promotions. The customers on the lists can be directly associated to a promotion code and/or a piece code. The customer list data can be accepted and loaded with reference to promotion set-up data allowing the transaction processing system 12 to qualify the customers to a promotion.

Automated Integration. A user interface front end promotional service can provide automated integration to and from the campaign management tool.

Customer Selections. A tool can allow the selection of all customer data criteria from the customer database, including, but not limited to, agent, customer, country, product and transactions. Selections can also be made by customer flags (i.e., opt-in/out).

Customer List. A tool can provide customer information in multiple predefined standard layouts for mail shop, database loading and transfer to downstream systems.

Marketing and Campaign Analysis. A tool can run analyses on transaction histories, campaign responses, etc. The tool can deliver information to systems to which it is interfaced by writing the data to files.

Customer Sampling. Random sampling and anything can be provided.

List Suppression. A tool can suppress against multiple lists.

Build New Business Metrics. A tool can perform various data transformations and build new business metrics. The tool can transform codes into values, assign attributes based on conditional logic, create range breaks and build expressions or aggregates. By way of example, the tool can allow a business analyst to create measures to perform recency, frequency and monetary analysis.

Measure Campaign Results. A tool can measure the results of a campaign. The tool can, for example, save a campaign history in a database for evaluation and response analysis.

Export Results. A tool can be used to report results to common applications such as Microsoft Excel, Powerpoint or Word.

Automatic-Data Driven Activities. A tool can allow on-off, or multiple, data-driven activities to be processed cyclically (waves), automatically without user intervention.

Infrastructure support.

Identification of Customer Buying and Other Transaction Patterns.

Promotions in Database 14

Promotion information including rules and discount amounts is stored in promotion database 14. Additional information such as the agent's commission share burden for associated promotions can also be stored in database 14. Examples of consumer driven or explicit promotions that can be provided by system 10 include the following.

Direct to Consumer Next Transaction Direct Mail. By way of example, mail offers can be directed to a promotion engine driven list of customers from the customer database 16, where the offer states that the customers will receive a certain amount of money off the fee for their next transaction within a given time period. No promotion code is needed for a promotion of this type. The discount can be internally applied when the customer information is populated at the time of the customer's next transaction.

Surprise and Delight. Lists of customers selected from customer database 16 can receive their next transaction free or at a reduced fee based on a current campaign. In one embodiment the agents at terminals 20A-20C, and the customer receives the reduced fee transaction without prior knowledge of the promotion.

Direct to Consumer Through Internal Tracking Direct Mail. Direct mail offers are made to customers selected from database 16. The offer can state that if the customer makes a certain number of transactions (e.g., three), one or more subsequent transactions (e.g., the fourth) is free within a set period of time (e.g., six months).

Receipt Offer on Next Transaction—Consumer Direct. By way of example, a receipt can be printed after a completed transaction offering a discount off a subsequent transaction (e.g., 20% off the next US to US transaction). A promotion code can be printed on the receipt, and the agent at a terminal 20A-20C uses the promotion code on the next transaction to apply the discount. In one embodiment of this promotion, the promotion code is unique to the customer and can only be applied once.

Direct to Consumer Volume Tiered Loyalty. An existing loyalty program can be relaunched as a tiered frequency loyalty promotion. Alternatively, the program can be a new loyalty program that is independent of any existing programs or co-existing with other loyalty programs. For example: Enroll to save; complete three transactions and save 5% on the next three transactions; complete six transactions and save 10% thereafter until a specified date; all transactions must occur within a certain time period.

Direct to Consumer Volume Loyalty. An existing loyalty program can be relaunched as a frequency loyalty program. Alternatively, the program can be a new loyalty program that is independent of any existing programs or co-existing with other loyalty programs. For example: Enroll to save up to $10.00 on every $8^{th}$ transaction completed within a certain period of time.

Direct to Consumer Value Tiered Loyalty. The program can be a new loyalty program that is independent of any existing programs or co-existing with other loyalty programs. Alternatively, the program can be a relaunch of an existing program. For example: Send $1500.00 or more and save 10% thereafter until a specified date; send $2500.00 or more and save 15% thereafter until the specified date; all transactions must occur within a certain period of time ending on the specified date.

Direct to Consumer Volume and Value Tiered Loyalty. The program can be a new loyalty program that is independent of any existing programs or co-existing with other loyalty programs. Alternatively, the program can be a relaunch of an existing program. For example: Complete three transactions totaling $1500.00 or more and save 10% thereafter until a specified date; complete six transactions totaling $2500.00 or more and save 15% thereafter until the specified date; all transactions must occur within a certain period of time ending on the specified date.

Examples of non-explicit promotions that can be provided by system 10 include the following. These promotions can, for example, be provided over media such as TV, radio or other broadcasts, magazines, newspaper or other publications, and can be done in connection with coupons having promotion codes.

Promotion Code Driven Direct Mailing. The customer database 16 and/or an external source can be used as the mailing list origin. For example: Direct mail to consumers with an offer stating that they will receive $2.00 off on transactions from the U.S. to another specified country; promotion code xxx is used for anyone who presents the promotion code for a certain time period. The direct mailer can identify participating agents or other points of entry.

Location Specific Direct Mail. The customer database 16 and/or an external source can be used as the mailing list origin. For example: Direct mail to consumer stating that all transactions from agents at a specific store receive $5.00 off for the next three months. Promotion code yyy is entered by the agent when the consumer brings in the direct mail with the transaction request.

Traditional Mass Media. For example: Promotion code zzz is in an advertisement in the newspaper. The advertisement offers 5% off of transactions over $30.00 for one month. The agent will enter promotion code zzz and the transaction processing system 12 will take 5% off the transaction fee. As another example: No promotion code is printed, but a newspaper advertisement states that all U.S. to another specified country transactions in a specified month have a 10% discount. The U.S. to that specified country corridor transaction has a promotion identifier attached in the promotion database 14 or transaction processing system 12, and the fee discount is automatically applied without the agent having to enter a code at the terminal 20A-20C. The reason for the discount can be printed on the receipt. As yet another example: promotion code xxx is published with an advertisement in a newspaper; the advertisement offers 5% off of transactions over $300.00 during a specified month at a specified agent location; the agent will enter the promotion code xxx and the transaction processing system 12 will discount the transaction fee by 5%.

Receipt Offer on Next Transaction—Consumer Direct. For example: A receipt is printed after a completed transaction offering to take 20% off the next transaction for U.S. to U.S. transfer; a promotion code is printed on the receipt and the agent at terminal 20A-20C uses the promotion code on the next transaction to apply the discount to the fee. In one embodiment the promotion code is unique to the consumer, can be used by anyone, and can only be applied once.

Promotion Set Up by Transaction Processing System 12

Authorized personnel can use terminal 18 to set up and maintain promotions in the money transfer system 10. Rules and other descriptive information about promotions is stored in promotion database 14 in one embodiment of the invention. In other embodiments, some or all of the promotion information is stored in other memory locations. Promotions can be given a unique promotion identifier, a short name, a narrative description and have legal terms and conditions defined. Baseline promotion rules, control and eligibility items that are captured include the following:

Duration. Duration can be indicated with start date and end date.

Historical Eligibility View. The period of time that award engine 24 searches when considering history to determine eligibility.

Status. This parameter indicates the current promotion status (e.g., set-up, active, closed).

Type of Promotion. Examples include loyalty, surprise, receipt direct and others described above.

Loyalty Program Indication. The promotion can be indicated to be one associated with the loyalty program. Loyalty program offers can have a unique class or category of promotion. Certain rules can, for example, apply only to loyalty program participants in some embodiments of the invention (e.g., the limitation of one active loyalty program promotion and the option to combine that promotion with another). In these embodiments the set-up process can ensure that only one loyalty program promotion is active.

Code Requirement. If desired, eligibility for a promotion can require that a promotion code or piece code be entered or provided by the customer. This requirement is specified as part of the rules set up.

Commission Sharing. The set up items can include information relating to commission sharing. For example, an agent commission discount share override and/or the agent discount share rate can be indicated. During settlement, any override rate can be used for agents when calculating the commission share of transaction fees for associated promotions. Such a share rate can override standard commission discount share rates.

Promotional Messages. Any messages to be printed on receipts or otherwise displayed to the customer or agent, and any associated data items passed as message variables to the point of entry, can be indicated.

Promotion Rules Security. The rules and other descriptive items can be secured to prevent changes (e.g., with respect to eligibility rules, reward schedules, and calculations to active promotions with transaction history).

Marketing and Campaign Facts. Attributes required or useful to the marketing analytics system 22 can be entered.

Relationship to Loyalty Program. A promotion can be indicated to be combinable or not combinable with loyalty program rewards.

Point of Entry Eligibility Control. Points of entry that are eligible to process promotions can be identified. Eligible points of entry must have the capability of supporting the data needs of associated promotions. For example, minimum software release numbers at eligible points of sale can be specified.

Send Location Eligibility Control. Eligible send locations (locations to which money can be transferred) for the promotion can be identified (e.g., by agent, agent location, and geographic location).

Currency Eligibility Control. Valid send currencies for the promotion can be identified. For example, promotions that specify the reward as a monetary amount may be required to be send currency specific and require transactions to originate in a designated currency. Percentage type discounts may not require currency restrictions.

Eligible Times. The eligible time period within the promotion duration can be identified. Examples include specific days of the week, time slots, weeks of the month, and date to date (i.e., promotion period start and end dates).

Eligible Customers. Eligible customers can be identified. Examples include explicit (pre-qualified) customers, non-explicit (mass marketing) customers or both.

Eligible Products. The operator of money transfer system 10 may offer a number of different products (e.g., money transfer, bill pay, money orders, official checks, gift certificates). Products eligible for a given promotion can be identified.

Eligible Transactions. The operator of money transfer system 10 may offer a number of different delivery options for certain products (e.g., will-call, directed sends). Eligible transaction types and/or delivery methods can be identified.

Reward Schedules. For example, frequency and recurrence information can be identified for rewards based on number of eligible transactions (e.g., set the reward occurrences to identify the rewarding at specific nth transactions and optional recurring nth transactions). Value tiered information can be identified for rewards based on amounts sent (e.g., the amount tier levels and corresponding discount percentages). Volume tiered information can be identified for rewards based on the number of qualified transactions completed (e.g., the number tier levels and corresponding discount percentages). Similar information can be identified for volume plus value tiered rewards.

Award Definitions. The awards to be given per the reward schedule are identified. Examples include a fixed amount to be taken off the base fee, a percentage to be taken off the base fee amount, and/or a fixed or flat fee amount. Amounts can be specified in any required send currency for the promotion.

Award Limits. Any award limits can be identified. Examples of award limits include a maximum award amount a customer can be awarded for participating in a promotion, maximum reward (discount) per transaction in a promotion, maximum quantity and number of rewards through participation in a promotion.

Promotion Codes. Available promotion codes and usage rules can be created and defined. The codes are preferably synchronous with the codes defined in the marketing analytics system 22. The codes can indicate whether the associated promotions are time limited, one time use or time unlimited. The codes can be identified as explicit or implicit.

Piece Codes. Piece codes can be used in connection with some promotions, and will often be logically subordinate to any promotion codes. Piece codes generally have more granular identity than promotion codes, and can be associated with a customer by the mail piece or receipt. Piece codes can have the attributes of promotion codes, and in addition be linked to a customer.

Promotional Messages. Promotional messages for display and/or printing at the point of entry can be identified. All promotions can make use of a common set of messages. The messages can have unique identifiers indicating whether they are for print, display or both, static text parts for each language, the number and positional location of variables for each language.

Import Customer Segments. The import of eligible and pre-qualified customer segments from the marketing analytics system 22 can be supported. In one embodiment of the invention eligible customers provide a code at the point of entry to participate in the promotion, and pre-qualified customers do not.

Import Piece Codes. The import of piece codes generated by marketing analytics system 22 and assigned to customers can be supported.

Award Engine 24

Award engine 24 interfaces with other components of the transaction processing system 12, including loyalty account processor 26 and pricing service 28, and with databases 14, 16 and/or 17 either directly or through the other components of the transaction processing system. The base fee is returned from pricing database 17 through pricing service 28, and may be a special non-promotional price. Calculation of any promotional discounts to which the customer may be entitled can be done by the award engine 24 to enhance the consistency of promotional performance and tracking.

As described above, one embodiment of the invention distinguishes between transactions that qualify for benefits of the loyalty program and transactions that do not qualify for the loyalty program. The presence of a loyalty program number during a transaction indicates the completion of the verification of the customer as a loyalty program member, thereby qualifying the customer. The transaction is qualified for loyalty program benefits if the transaction date is between the loyalty start and end dates and the transaction is one entitled to loyalty program benefits (e.g., if the send location is the U.S. and the transaction is a money transfer).

In the embodiments of the invention that provide promotion benefits only to members of the loyalty program, the award engine 24 increments the qualified transaction tally for the customer and determines the discounts to which the customer is entitled. For example, if entitled to tiered offers the tier level can be determined by comparing the current transaction tally to tier plateaus, and to obtain the discount percentage or amount for the tier. The discount can then be applied to the base fee amount. Similarly, for non-tiered offers, if the transaction tally is at a reward level frequency, the discount percentage or amount is determined for the frequency and applied to the base fee.

The award engine 24 returns the loyalty program discount fee results for display at the terminals 20A-20C. The base fee is provided as the non-discounted fee amount. The discount adjusted fee amount is provided as the fee amount for qualified transactions. The base fee amount is provided as the fee for non-eligible transactions.

Upon confirmation of a successfully completed transaction, the records in the customer database 16 are updated to reflect the transaction. If appropriate, the stored information reflects the customer's transaction as one done in connection with a loyalty program promotion. This information can be used to validate past and future promotion eligibility and loyalty program participation and progression tallies and reporting. Transactions that fail to complete are not tracked as participating in the promotion in one embodiment of the invention. In another embodiment of the invention, same day reversals are not counted in the tally for loyalty program accrual or rewards. Reversals or cancellations that that are not completed on the same day as the original transaction can similarly be not tracked as participating in the promotion.

As described above, other embodiments of the invention provide promotional benefits to customers that are not participants in the loyalty program. These non-loyalty program promotional benefits can be provided in addition to or as an alternative to those of the loyalty program. In this embodiment of the invention the award engine 24 can use the customer identity obtained and the promotion or piece code entered at the terminals 20A-20C. The award engine 24 interfaces with the pricing service 28 to obtain the base fee. Calculation of promotional prices can be done by the award engine 24 to enhance consistency of promotional tracking and maintenance.

In one embodiment of the invention the award engine 24 determines which if any promotional offers are available to the customer and selects the best. Selection for eligibility can be determined using the following sequence of methods: (1) Promotion or Piece Code Driven—the promotion or piece code provided by the terminal 20A-20C is always considered the best offer; (2) Explicit Customer Driven, Non-Loyalty Program—the customer is identified in a currently active pre-qualified list received from the marketing analytics system 22 with (a) the promotion giving the largest reward on the current transaction, or (b) promotion accrual; (3) Non-Explicit Promotions—A non-explicit promotion giving the largest reward on the current transaction; and (4) Loyalty Program—a loyalty program member discount may be combined with any discounts offered in (1)-(3) above when allowed by the promotion rules.

Eligibility is verified to ensure that the customer and transaction satisfy all the rules of the promotion. Examples include: (1) determining whether the promotion is in active status; (2) determining whether the customer is eligible for the promotion by (a) identifying the customer on an active pre-qualified list (e.g., a list received from the marketing analytics system 22) and/or (b) the promotion allows open (non-explicit) customers to participate; (3) if a valid promotion code or piece code was not provided, the promotion can offer an implied promotion code for the award engine 24 to assign (e.g., the transaction is not eligible if a promotion code cannot be assigned); (4) the transaction date is on or after the promotion start date and one or before the promotion end date; (5) the transaction date and time is within the eligible time period within the promotion (if specified); (6) the transaction send location is eligible; (7) the transaction send agent is eligible; (8) the transaction type is eligible; (9) the transaction send currency is valid; (10) the transaction face value is equal or greater than the threshold amount; and (11) the customer has not already been awarded the maximum available reward for the promotion (e.g., this can be based on the number or value of previous rewards by the promotion rules).

The scheduled transaction reward is then located by the award engine 24. For occurrence and recurrence (frequency) promotions, the customer's transaction tally is incremented by one. If the transaction tally is equal to one of the occurrence or recurrence frequency points, then the reward type and value set for the frequency is set. For value tiered promotions, the aggregate face value of the customer's qualified transaction history is compared to the tier level amounts set in the reward schedule. The selected schedule tier reward level can be the one with the tier value nearest and of lesser or equal value than the aggregate amount. For volume tiered promotions, the customer's previous tally of qualified transactions is incremented by one to provide a new transaction total. The transaction tally is then compared to the tier level quantities set in the reward schedule. The schedule tier reward level selected can be the one with the tier quantity nearest and of lesser value than the transaction tally total. For volume plus value tiered promotions, the customer's previous tally of qualified transactions is incremented by one to provide a new transaction total. The transaction total and aggregate face value of the customer's qualified transaction history is compared to the tier level quantities and amounts set in the reward schedule. The schedule tier reward level selected can be the one with the tier quantity nearest and of lesser value than the transaction tally total and the aggregate amount is equal or greater than the tier value amount.

If the transaction is eligible, but not selected or scheduled for a reward, it can be categorized as an accrual transaction. Accrual transactions may not be given a discount, but are considered eligible and tallied as part of the customer's transaction history. Rewardable transactions have the selected reward formula applied to the base fee amount using the reward type and value set for the selected tier or frequency giving the discount amount and fee amount. When calculating the discount the award engine 24 considers any promotion maximum amount limit and the transaction maximum amount limit. If either is exceeded, the discount is adjusted to the smallest value allowable by the associated rules. The discount amount typically cannot exceed the base fee.

The promotional discount and any associated results are then returned to the terminals 20A-20C for display and/or printing. Eligible transactions can return the promotion code used, base fee amount, fee amount, promotional message identifier and any variable message components (in the appropriate language). Non-eligible transactions can return the base fee amount and fee amount. The promotion code identifier can be left blank, or can contain a value to indicate that no promotion was applied. Applicable promotional messages are identified and the associated variable message components are assembled. Loyalty program or frequency promotion messages can be tailored to alert the agent and customer when the next transaction will be free or discounted.

Confirmed transactions will be processed and a completion status returned. Successfully completed transactions will initiate promotional record keeping of the customer's transaction history in customer database 16. For example, information indicating that the customer and transaction participated in the promotion identified by the promotion code can be stored. The stored history can include information that validates past and future promotion eligibility, loyalty program participation, progression tallies and reporting. Examples include customer identification, promotion identification, promotion code, transaction date, transaction type, face value, base fee amount, discount amount and fee amount. Transactions that fail to complete may not be tracked as participating in a promotion.

Agent Commissions and Reporting by System 12

Transaction processing system 12 can be configured to generate reports describing the share or burden of customer discounts, if any, that are applicable to the agents operating terminals 20A-20C. Different agents may have different contractual commission arrangements with the operator of money transfer system 10, and for any given type of promotion or reward the share burden the agents' commissions can be different. Information representative of the contractual base or standard commission share burden for each agent and the share burden for each promotion can be stored (e.g., in a commission database (not shown)). Transaction processing system 12 can thereby generate accurate commission reports for each agent.

Loyalty program accrual reports can show potential or projected agent commission liability based on consumer participation. For example, the report can include the number of customers and transactions participating at tier levels with the percentage and discounts given. Non-tiered loyalty promotion reports can include the number of consumers by frequency progression and discounts given. Customer loyalty promotions that reward customers "progress" with free or discounted transactions can capture the participating customers, the progress they are making toward the reward and the expected redemption value. This information can be used by the transaction processing system 12 to accrue for expenses that may be incurred in the future.

In one embodiment of the invention the agent's send discount share burden is stored as a percentage to be used when calculating commissions on transactions in all promotions. An agent can participate in all promotions at the same discount share burden rate. Alternatively, the share burden rate can differ for different promotions. In one embodiment of the invention, this accounting process can be implemented by including in the promotion rules in the promotion database 14 an overriding send agent discount share burden percentage. During settlement the transaction processing system 12 can determine whether a discount share burden rate is associated with the promotion identifier, and if found, use that discount burden rate in the commission calculation instead of the non-promotion agent rate.

In one embodiment of the invention the receiving agent's commission is calculated by applying the standard rate to the final fee amount. In other embodiments the receiving agent's commission can be calculated from the base fee.

The invention offers a number of important advantages. Marketing personnel can effectively define customer segments and profile these segments to identify patterns within the customer data. These personnel can also enter selection criteria from the customer database for promotional opportunities. The customer and promotional information provided can be optimized by customer, nature of offer and timing of offer.

Although the present invention has been described with reference to preferred embodiments, those skilled in the art will recognize that changes can be made in form and detail without departing from the spirit and scope of the invention. In particular, although components of the transaction processing system are shown and described as different physical elements, these components can alternatively be different logical components of one or more common physical components of the system. Although described in connection with a money transfer system, the invention can also be used in connection with other products provided by the operator of the system, including bill pay, money orders, gift cards, etc.

What is claimed is:

1. A money transfer system capable of providing discounted fee money transfer transactions, including:
  point of entry ports to communicate transaction information with points of entry;
  a promotion database including information representative of promotions, including promotions pricing, and promotion commission share burdens of the point of entry operator, and wherein the information representative of promotions includes information representative of promotions available only to loyalty program members;
  a customer database including information representative of customers' transaction histories and customers' loyalty identifiers for customers that are members of a loyalty program;
  a pricing database including base transaction pricing;
  a commission database including information representative of base commissions paid to operators of the points of entry;
  an analytics port to communicate marketing information with a marketing analytics system; and
  a transaction processing system connected to the point of entry ports, promotion database, customer database, pricing database and analytics port, wherein the transaction processing system is configured to:
    update the promotion database as a function of the marketing information;
    receive money transfer transaction requests, wherein at least some of the requests include loyalty identifiers identifying the customers as loyalty program members;
    determine whether any received loyalty identifiers are valid;
    determine based on information in the promotion database whether requested transactions are entitled to promotions, including whether the requested transaction is entitled to any loyalty program promotions;
    determine transaction pricing information as a function of the base transaction pricing in the pricing database and the promotions pricing in the promotion database that are associated with transactions determined to be entitled to promotions;
    provide the transaction pricing information to the point of entry ports associated with the transactions to enable the transaction pricing information to be communicated to the associated points of entry;
    compute and store data representative of the point of entry operator's commission as a function of the base commission and the promotion commission share burden;
    generate and store commission reports representative of computed point of entry operator commissions;
    processing the transaction, including determining whether the transaction was completed;
    update the customer database as a function of transaction information, including whether the transaction was entitled to a loyalty program promotion; and
    provide transaction information to the analytics port.

2. The money transfer system of claim 1 and further including a marketing analytics system coupled to the analytics port.

3. The money transfer system of claim 1 wherein the promotion database includes information representative of one or more promotions of the type including frequency and recurrence promotions, value tiered promotions, volume tiered promotions, and volume plus value tiered promotions.

4. The money transfer system if claim 1 wherein the promotion information includes promotion rules.

5. The money transfer system of claim 1 wherein updating the promotion database includes identifying individual and/or groups of customers entitled to promotions.

6. The money transfer system of claim 1 wherein providing transaction pricing includes providing the base fee, the discount amount and the fee.

7. The money transfer system of claim 1 wherein updating the customer database includes identifying one or more of the type of transaction, point of entry location, send location, transaction amount, currency type and time of transaction.

8. The money transfer system of claim 1 wherein providing transaction information to the analytics port includes providing transaction history information.

9. The money transfer system of claim 1 and further including providing transaction text messages relating to promotions.

10. The money transfer system of claim 1 and further including providing transaction text messages relating to future discounts.

11. The money transfer system of claim 1 wherein updating the customer database includes maintaining customer transaction tallies.

12. A money transfer system used in connection with a loyalty program where loyalty program members are assigned a loyalty identifier and capable of providing discounted fee money transfer transactions, including:
point of entry ports to communicate transaction information with points of entry;
a promotion database storing promotion information for loyalty program promotions and non-loyalty program promotions, the promotion information including one or more of promotion rules, promotion discounts and point of entry operator promotion commission share burdens;
a customer database storing customer identity information and customer transaction history information, the customer identity information including any loyalty identifier and the transaction history information including an identification of the transaction as a loyalty program transaction or a non-loyalty program transaction and one or more of transaction send location, transaction point of entry location, transaction type, transaction currency and time of transaction;
a pricing database storing base transaction pricing information;
a commission database storing point of entry operator base commission information;
a marketing analytics system for processing the customer identity information and/or the customer transaction history information to provide marketing information relating to promotions; and
a transaction processing system connected to the point of entry ports, promotion database, customer database, pricing database, commission database and marketing analytics system, wherein the transaction pricing system is configured to:
modify the promotion information in the promotion database as a function of the marketing information received from the marketing analytics system;
receive money transfer transaction requests, including loyalty identifiers;
determine whether any received loyalty identifier is valid;
determine based on information stored in the promotion database and customer database whether the requested transaction is entitled to a loyalty program promotion and/or a non-loyalty program promotion as a function of the promotion rules and any received and valid loyalty identifier;
determine transaction pricing information as a function of the base transaction pricing information in the pricing database and the promotion discounts in the promotion database that are associated with transactions determined to be entitled to promotions;
provide the transaction pricing information, including the base transaction fee and the promotion discount and fee if the transaction is entitled to a promotion to the point of entry ports to enable the transaction pricing information to be communicated to the points of entry;
determine and store data representative of a commission of the point of entry operator associated with the transaction as a function of the point of entry operator base commission information in the commission database and the promotion commission share burden information in the commission database if the transaction is entitled to a promotion;
generate and store commission reports representative of computed point of entry operator commissions;
update the customer transaction history information in the customer database as a function of transaction information, including tallying the transaction as a loyalty program transaction if the transaction was entitled to a loyalty program promotion;
processing the transaction, including determining whether the transaction was completed;
provide transaction information to the analytics port; and
periodically provide the marketing analytics system with the customer transaction history information.

13. The money transfer system of claim 12 wherein the promotion database includes promotion information representative of one or more promotions of the type including frequency and recurrence promotions, value tiered promotions, volume tiered promotions, and volume plus value tiered promotions.

14. The money transfer system of claim 13 wherein the marketing information received from the marketing analytics system includes identification of individual and/or groups of customers entitled to promotions.

15. The money transfer system of claim 14 and further including providing transaction text messages relating to promotions.

16. The money transfer system of claim 15 and further including providing transaction text messages relating to future discounts.

17. A method for operating a transaction processing system to perform a discounted fee money transfer transaction, comprising:
receiving, by the transaction processing system, a send amount and a customer identifier from an agent terminal, wherein at least some of the received customer identifiers are representative of customers that are loyalty program members;
determining, by the transaction processing system, whether any received customer identifiers are representative of valid loyalty program members;
determining, by the transaction processing system, based on stored information including information in a promotion database whether a customer associated with the customer identifier is eligible for a promotional discount, including whether the customer is eligible for a loyalty program promotional discount;

calculating, by the transaction processing system, a transaction fee based on the send amount;

determining, by the transaction processing system, if the customer is eligible for the promotional discount, a discount amount based on information stored in a promotion database and calculating a discounted fee as a function of the discount amount and the transaction fee based on the send amount;

determining, by the transaction processing system, an agent base commission for the transaction based on information stored in a commission database;

determining, by the transaction processing system, if the customer is eligible for the promotion discount, a promotion commission share burden of an agent associated with the transaction for the transaction based on information stored in a database;

determining, by the transaction processing system, if the customer is eligible for the promotion discount, an agent commission as a function of the agent base commission and the promotion commission share burden and storing the determined agent commission; and generating, by the transaction processing system, and storing commission reports representative of the determined agent commissions; and returning to the agent terminal, by the transaction processing system, the discounted fee and a promotional message to enable the discounted fee and the promotional message to be displayed by the agent terminal; and updating, by the transaction processing system, a database with information representative of the transaction, including whether the transaction was entitled to a loyalty program promotion; and processing the transaction, including determining whether the transaction was completed.

18. The method of claim 17 and further comprising determining the agent's commission as a function of the discounted fee.

19. The method of claim 17 wherein determining whether a customer is eligible for a promotional discount includes identifying a location of the agent terminal and determining whether the customer is entitled to a location-based promotional discount.

20. The method of claim 17 wherein determining whether a customer is eligible for a promotional discount includes determining a number of previous transactions credited to the customer and determining whether the customer is entitled to promotional discount based on the number of previous transactions.

21. The method of claim 17 wherein:

the method further includes receiving a promotional code from the agent terminal; and determining whether a customer is eligible for a promotional discount includes determining a promotional discount as a function of the promotional code.

* * * * *